(12) United States Patent
Dorrance et al.

(10) Patent No.: US 7,164,472 B2
(45) Date of Patent: Jan. 16, 2007

(54) COMMON REFERENCE TARGET MACHINE VISION WHEEL ALIGNMENT SYSTEM

(75) Inventors: Daniel R. Dorrance, Ballwin, MO (US); Timothy A. Strege, Ballwin, MO (US); Leigh R. Burns, Jr., Troy, IL (US); Mark S. Shylanski, University City, MO (US); Thomas J. Golab, St. Peters, MO (US)

(73) Assignee: Hunter Engineering Company, Bridgeton, MO (US)

( * ) Notice: Subject to any disclaimer, the term of this patent is extended or adjusted under 35 U.S.C. 154(b) by 218 days.

(21) Appl. No.: 10/682,247

(22) Filed: Oct. 9, 2003

(65) Prior Publication Data

US 2005/0078304 A1    Apr. 14, 2005

(51) Int. Cl.
G01B 11/26 (2006.01)
G01C 1/00 (2006.01)
(52) U.S. Cl. .................................. 356/139.03
(58) Field of Classification Search ............ 356/139.09
See application file for complete search history.

(56) References Cited

U.S. PATENT DOCUMENTS 5,675,515 A * 10/1997 January ...................... 700/279

| 5,724,128 | A | 3/1998 | January |
| 5,724,129 | A | 3/1998 | Matteucci |
| 5,724,743 | A | 3/1998 | Jackson |
| 5,809,658 | A | 9/1998 | Jackson et al. |

(Continued)

FOREIGN PATENT DOCUMENTS

DE    2948573    4/1981

OTHER PUBLICATIONS

Copyright 1999, Hunter Engineering Company "DSP400 Alignment Sensors"—(product literature document).

(Continued)

*Primary Examiner*—Thomas H. Tarcza
*Assistant Examiner*—Luke D. Ratcliffe
(74) *Attorney, Agent, or Firm*—Polster, Lieder, Woodruff & Lucchesi, L.C.

(57) ABSTRACT

A camera configuration for a machine vision vehicle wheel alignment system which does not dispose all of the cameras on a single rigid structure, such that cameras disposed to view the left side of a vehicle are movable independently of the cameras disposed to view the right side of the vehicle, while maintaining a common reference coordinate system for determining vehicle wheel alignment angles.

9 Claims, 6 Drawing Sheets

U.S. PATENT DOCUMENTS

| | | |
|---|---|---|
| 6,115,927 A | 9/2000 | Hendrix |
| 6,148,528 A | 11/2000 | Jackson |
| 6,298,284 B1 | 10/2001 | Burns, Jr. et al. |
| 6,310,644 B1 | 10/2001 | Keightley |
| 6,341,013 B1 | 1/2002 | Battiti et al. |
| 6,424,411 B1 | 7/2002 | Rapidel et al. |
| 6,483,577 B1 | 11/2002 | Stieff |
| 6,594,600 B1 | 7/2003 | Arnoul et al. |
| 6,691,062 B1 | 2/2004 | Nobis |
| 6,731,382 B1 | 5/2004 | Jackson et al. |
| 6,839,972 B1 | 1/2005 | Jackson et al. |
| 2002/0027651 A1* | 3/2002 | Jackson et al. ........ 356/139.09 |
| 2002/0080343 A1 | 6/2002 | Bux et al. |
| 2002/0189115 A1 | 12/2002 | Jackson et al. |
| 2003/0023395 A1 | 1/2003 | O'Mahony et al. |
| 2003/0065466 A1 | 4/2003 | Jackson et al. |
| 2003/0147068 A1 | 8/2003 | Corghi |

OTHER PUBLICATIONS

Copyright 1998, Hunter Engineering Company; Installation Instructions DSP400 Sensors —pp. 1-40 (Hunter product literature document).

John Bean —Visualiner 3-D Installation Instructions —Form 5489-5 —pp. 37-41 - Apr. 5, 2001.

Visualiner 3 D Service Manual —Form 5576 —pp. 7-8, 20-23, & 104 —Mar. 15, 1999.

* cited by examiner

COMMON REFERENCE TARGET MACHINE VISION WHEEL ALIGNMENT SYSTEM

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to machine vision vehicle wheel alignment systems configured to measure the locations and orientation of the vehicle wheels in a three dimensional coordinate system, and more particularly, to configurations of machine vision cameras and optical targets disposed about a vehicle undergoing an alignment inspection.

Machine vision vehicle wheel alignment systems have been in use by the vehicle service industry for several years. A typical machine vision vehicle wheel alignment system, such as the Series 811 wheel alignment system, configured with the DSP600 sensors manufactured by Hunter Engineering Co. of Bridgeton, Mo. consists of a console unit, cameras, and optical targets. The console unit contains a computer configured with image processing and vehicle wheel alignment software applications, and incorporates various operator interfaces, including a keyboard, a mouse, a printer, and a display device. The cameras are coupled to the computer, and the optical targets are disposed in the field of view of the cameras, typically mounted to the wheels of a vehicle undergoing an alignment inspection.

Commonly, to view the left and right sides of a vehicle, one or more cameras are disposed on opposite sides of the vehicle, each having a field of view encompassing one or more wheels of the vehicle. In alternative configurations, two cameras are provided on each side of the vehicle, each having a field of view encompassing a single vehicle wheel, i.e. a left front, left rear, right front, and right rear wheel, respectively. To facilitate vehicle wheel alignment, optical targets are mounted on the vehicle wheels, and observed by the cameras. The optical targets preferably have predetermined features which are identified in images obtained by the cameras, and which facilitate a determination of the position and orientation of the optical targets. The image processing may take place in the camera modules, in an interface computer, or in the console computer. Once the position and orientation of each optical target is determined, the position and orientation of the associated vehicle wheel can be determined, and correspondingly, the various vehicle wheel alignment angle measurements may be either determined or calculated. These angles typically include camber, caster, and toe angles for each vehicle wheel, the vehicle centerline, and the vehicle rear thrust line.

With conventional machine vision vehicle wheel alignment systems, the positional relationship between each camera utilized in the system is fixed and known, permitting the computer to transform coordinates identified in one camera field of view to corresponding coordinates in a second camera field of view, or to a common coordinate reference system. To establish and maintain the positional relationship between each camera, the cameras in a conventional vehicle wheel alignment system are typically mounted to a common rigid support structure, such as a cross member or frame. If movement of the cameras is required, the rigid support structure ensures that the camera to camera positional relationship is maintained.

For some applications and installations of machine vision vehicle wheel alignment systems, the utilization of a single rigid support structure which is sufficiently large so as to dispose cameras in operative positions to view both the left and right sides of a vehicle is impractical. For example, in drive-through vehicle service bays, a vehicle is typically driven into the bay from one side, and continues out the bay through the opposite side. This prohibits placement of fixed structures in front of the vehicle, unless such structures are suspended from the ceiling. If the ceiling is too high, too low, or not sufficiently stable, this becomes impractical. Correspondingly, in some service "pit" applications, the vehicle is driven onto supporting structures of a runway disposed with an open "pit" or service bay. In such applications, the "pit" or bay may extend around the front of the vehicle to the forward wall of the service area, preventing the placement of fixed or rigid mounting structures in front of the vehicle if there is insufficient clearance between the vehicle and the forward wall.

Prior art systems which utilize independent support structures for cameras displaced to view opposite sides of a vehicle are known. Typically, these systems rely upon calibration procedures carried out prior to measuring vehicle wheel alignment angles. The calibration procedures may utilize one or more cross-looking cameras and/or associated reference targets to determine a positional relationship between each of the camera support structures, which is stored for subsequent use. However, such systems inherently rely upon the assumption that once the positional relationship between the cameras or between the cameras and a corresponding optical target is calibrated, it does not change. Alternatively, the calibration procedures must be repeated after each change in position of the cameras, or change in position of a camera and a corresponding optical target, before vehicle wheel alignment measurements can be determined.

Accordingly, there is a need in the vehicle service industry for machine vision vehicle wheel alignment systems which do not require that all cameras be mounted to a single rigid structure, and that cameras disposed to view one side of a vehicle be movable independently of the cameras disposed to view the opposite side of the vehicle, while maintaining, in real-time, a common reference coordinate system for determining vehicle wheel alignment angles without the need to repeatedly recalculate and store positional calibration data.

BRIEF SUMMARY OF THE INVENTION

Briefly stated, the present invention sets forth a multi-camera configuration for a machine vision vehicle wheel alignment system which does not dispose all of the cameras on a single rigid structure, such that one or more cameras disposed to view a first side of a vehicle are movable independently of one or more cameras disposed to view the opposite side of the vehicle, while establishing a common reference coordinate system for determining vehicle wheel alignment angles.

In an alternate embodiment of the present invention, one or more cameras are configured to each view opposite sides of a vehicle. Each of the cameras configured to view the first side of the vehicle are disposed in a fixed relationship to each other, and correspondingly, each of the cameras configured to view the opposite side of the vehicle are disposed in a fixed relationship to each other. A reference target structure is disposed within the field of view of at least one camera configured to view the first side of the vehicle and in the field of view of at least one camera configured to view the opposite side of the vehicle, whereby a common reference coordinate system is established.

In an alternate embodiment of the present invention, one or more cameras are configured to view the left side of a vehicle, and one or more cameras are configured to view the right side of the vehicle. Each of the cameras configured to view the left side of the vehicle are disposed in a fixed relationship to each other, and correspondingly, each of the cameras configured to view the right side of the vehicle are disposed in a fixed relationship to each other. A first reference target is disposed in a fixed relationship to a mounting structure associated with the left side cameras, and a second reference target is disposed in a fixed relationship to a mounting structure associated with the right side cameras. At least one of the right side cameras is disposed to view the first reference target, and at least one of the left side cameras is disposed to view the second reference target, whereby a common reference coordinate system is established between the left and right side cameras utilizing the observed reference targets.

In an alternate embodiment of the present invention, a first set of cameras are secured to left side of a vehicle runway and configured to view the left side of a vehicle, and a second set of cameras are secured to the right side vehicle runway and configured to view the right side of a vehicle. Optionally, some of the cameras configured to view the left side of the vehicle are disposed in a fixed relationship to each other, and correspondingly, some of the cameras configured to view the right side of the vehicle are optionally disposed in a fixed relationship to each other. A first reference target structure is disposed within the field of view of each independent camera and at least one camera disposed in a fixed relationship to another camera, in the first set of cameras. A second reference target structure is disposed within in the field of view of each independent camera and at least one camera disposed in a fixed relationship to another camera, of the second set, whereby a common reference coordinate system based upon the observed reference target structures and upon the predetermine relationship of the vehicle runways is established between the left and right side camera sets.

In an alternate embodiment of the present invention, a first set of cameras are secured to left side of a vehicle runway and configured to view the left side of a vehicle, and a second set of cameras are secured to the right side vehicle runway and configured to view the right side of a vehicle. Optionally, some of the cameras configured to view the left side of the vehicle are disposed in a fixed relationship to each other, and correspondingly, some of the cameras configured to view the right side of the vehicle are optionally disposed in a fixed relationship to each other. A reference target structure is disposed within the field of view of each independent camera and at least one camera disposed in a fixed relationship to another camera, in each set of cameras, whereby a common reference coordinate system based upon the observed reference target structures and upon the pre-determine relationship of the vehicle runways is established between the left and right side camera sets.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
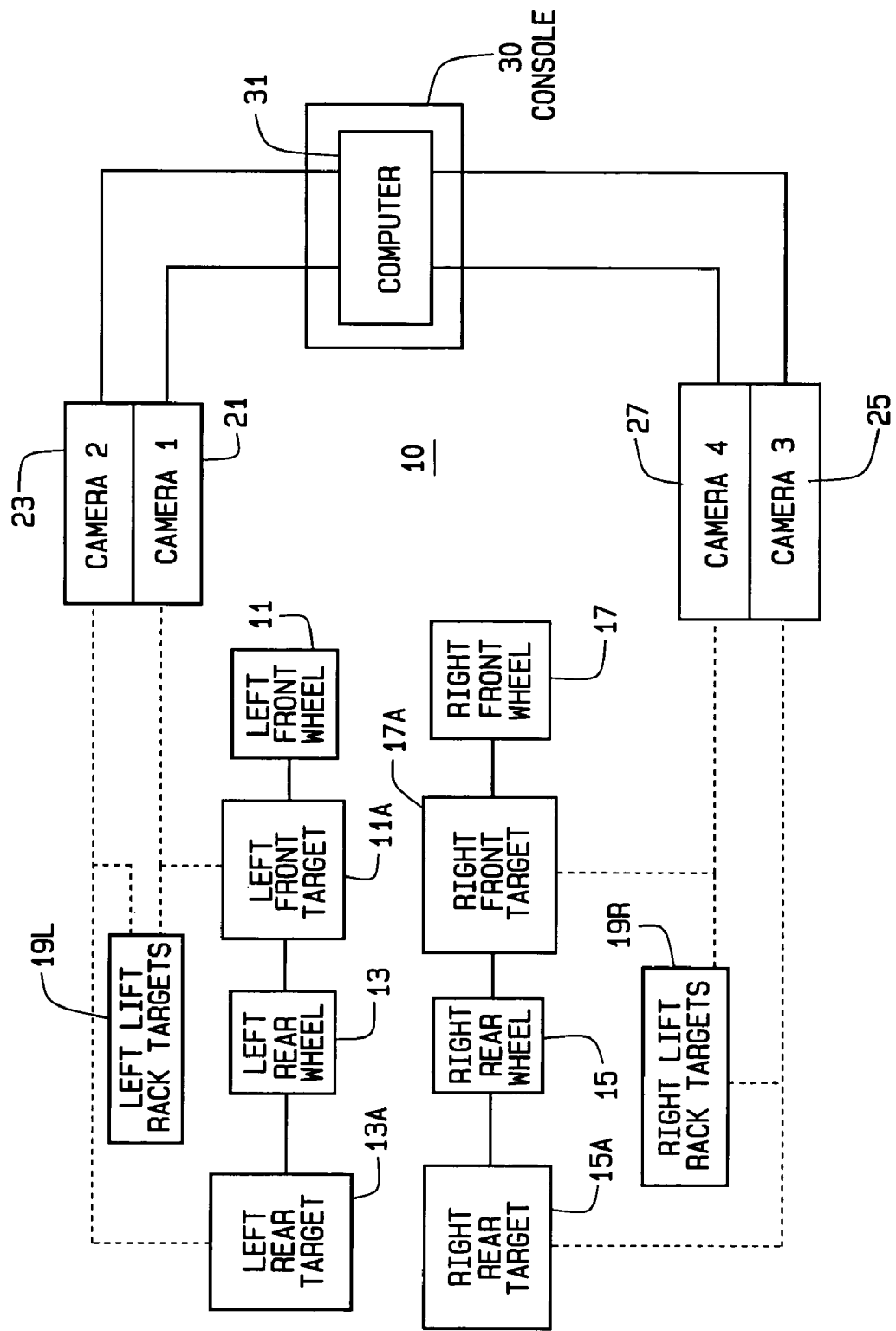
FIG. 1 is a block diagram of a prior art machine vision vehicle wheel alignment system.

Turning to FIG. 1, the basic components of a conventional machine vision vehicle wheel alignment system, such as the Series 811 Aligner with the DSP600 sensors from Hunter Engineering Co. of Bridgeton, Mo. are shown generally at 10. The system 10 is configured to determine the position and orientation of vehicle wheels 11, 13, 15, and 17, and the axis about which they roll. Each vehicle wheel has associated therewith one or more optical targets 11A, 13A, 15A, and 17A. Optionally, additional optical targets such as 19L and 19R may be associated with the two sides of a runway or other support structure on which the vehicle wheels rest. The optical targets such as 19L and 19R associated with the runways on which the vehicle wheels 11, 13, 15, and 17 rest are optionally used during the measurement process to define and measure the location, in a coordinate reference system, of the common plane of the runways, as described in U.S. Pat. No. 5,724,128 to January. The images of the optical targets are preferably obtained by four cameras 21, 23, 25, and 27, with one camera associated with each wheel. The optical paths between the targets and the corresponding cameras are illustrated by the dashed lines in FIG. 1. Those of ordinary skill in the art will recognize that the number of cameras may be varied, provided that images of each optical target are obtained and processed by the system.

The signals from the cameras are supplied to the wheel alignment system console, and in particular, to a computer or data processor 31 which may be disposed within the console. The computer or data processor 31 is configured with software to utilize data from the acquired images to determine various wheel alignment angles. The process of calculating the alignment angles may be done in many ways, such as shown in U.S. Pat. Nos. 5,488,472, 5,870,315, 5,675,515, and 5,724,128, the disclosures of which are herein incorporated by reference. Correspondingly, methods and procedures for processing images of optical targets to establish coordinate reference systems, identify positions and orientations within those systems, transform data between established coordinate reference systems, and to determine alignment measurements are well known to those of ordinary skill in the art of machine vision vehicle wheel alignment, and are shown in U.S. Pat. No. 6,064,750 to January et al., and U.S. Pat. No. 6,134,792 to January, the disclosures of which are herein incorporated by reference.

Figure 2:
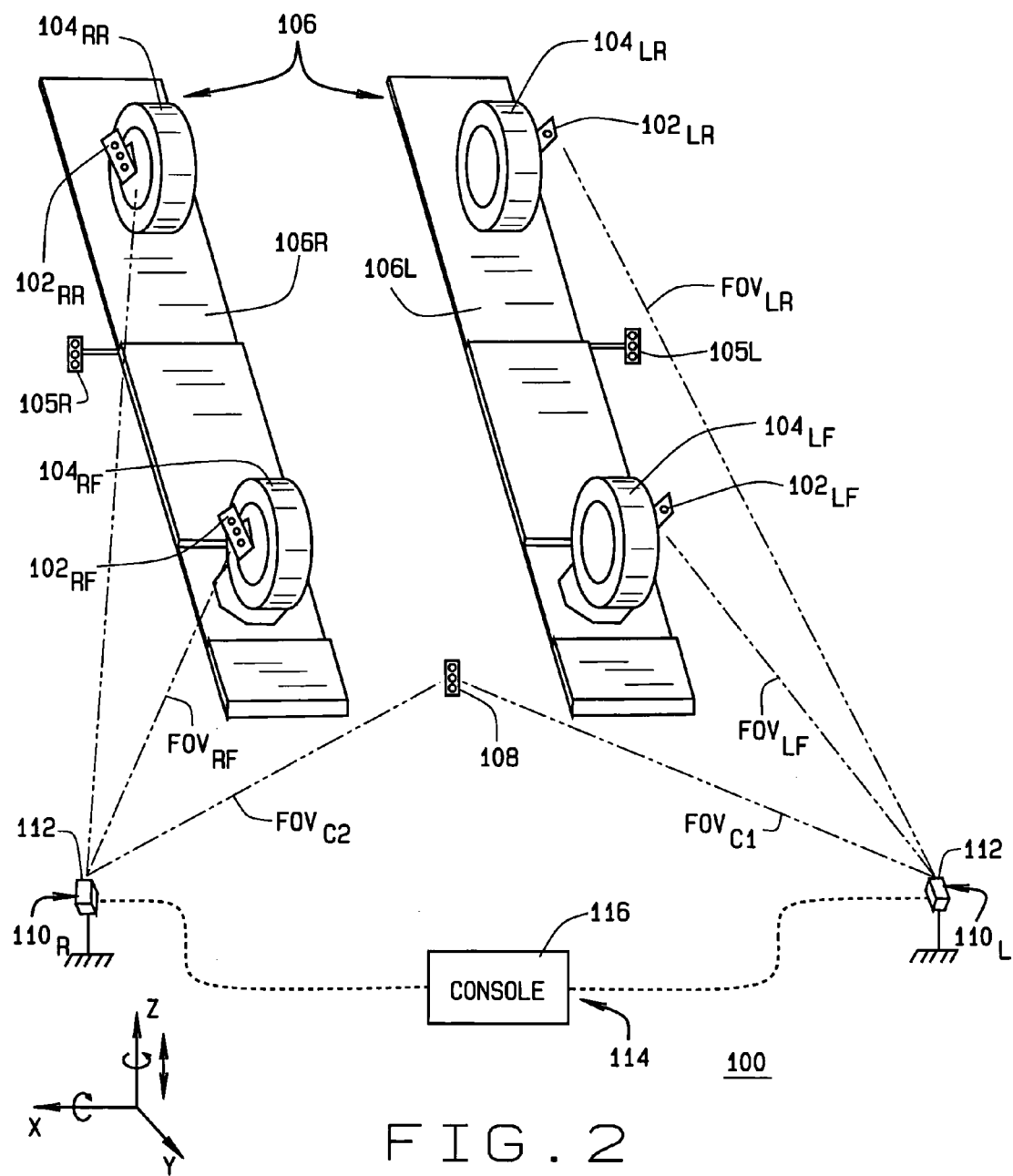
FIG. 2 is a simplified perspective view of a machine vision vehicle wheel alignment system configured with a multi-camera and target arrangement of the present invention.

Turning to FIG. 2, a machine vision vehicle wheel alignment system 100 is shown configured with a preferred multi-camera configuration of the present invention. The machine vision vehicle wheel alignment system 100 includes a set of conventional optical targets $102_{LF}$, $102_{RF}$, $102_{LR}$, and $102_{RR}$, mounted to the wheels $104_{LF}$, $104_{RF}$, $104_{LR}$, and $104_{RR}$ of a vehicle in a conventional manner, such as previously described. The wheels 104 may be either on the runways 106L and 106R of a runway system 106 such as a lift rack or service pit, or disposed on the ground or other fixed and substantially level surface. Optionally, an additional set of targets 105 is rigidly fixed to the runways 106L and 106R.

To obtain images of the optical targets 102 and a shared optical target 108, a pair of independently positioned camera systems or sensor heads $110_L$ and $110_R$ are preferably disposed in front of, and adjacent to, the left and right sides of the vehicle position. Alternatively, those of ordinary skill in the art will recognize that the camera systems or sensor heads 110 may be disposed elsewhere about the vehicle as required to view the optical targets 102 and the shared optical target 108. One or more cameras 112 are disposed in the camera system or sensor head $110_L$, and have fields of view $FOV_{LF}$, $FOV_{LR}$, and $FOV_{C1}$ which encompass the optical targets $102_{LF}$, $102_{LR}$, and the shared optical target 108. Correspondingly, one or more cameras 112 are disposed in the camera system or sensor head $110_R$ and have fields of view $FOV_{RF}$, $FOV_{RR}$, and $FOV_{C2}$ which encompass the optical targets $102_{RF}$, $102_{RR}$, and the shared optical target 108. Each camera system or sensor head 110 is optionally adjustable about a vertical axis Z to accommodate vehicles and runway systems of different heights, and is optionally translatable along a horizontal axis X, or rotatable about the vertical axis Z to accommodate vehicles having different track widths, whereby the optical targets 102 can be located optimally within the associated fields of view.

Those of ordinary skill in the art will recognize that the number of cameras 112 disposed in each camera system or sensor head 110 may be varied, provided that images of each optical targets 102 and the shared optical target 108 are obtained and processed by the machine vision vehicle wheel alignment system 100. When multiple cameras 112 are disposed in each camera system or sensor head 110, the spatial relationships between each of the cameras 112 in the camera system or sensor head 110 may be either determined during manufacture, or prior to use as described in U.S. Pat. No. 5,724,128 to January. These spatial relationships must remain constant between each determination.

The signals from the cameras 112 in each camera system or sensor head 110 are supplied to a computer or data processor 116 which may be disposed within the console 114. Those of ordinary skill in the art will recognize that the processing of images acquired by each of the cameras may be carried out in whole or in part by data processors located within the sensor heads 110, such that results are transferred to the computer or data processor 116, or alternatively, raw image data may be transferred to the computer or data processor 116 wherein all processing is carried out. The computer or data processor 116 is configured with software to utilize data from the acquired images to determine various wheel alignment angles. The positional relationship, or coordinate system transformation, between the cameras 112 disposed in the left sensor head $110_L$, and the cameras 112 disposed in the right sensor head $110_R$ is determined by the computer 116 utilizing a coordinate transformation between at least one of the cameras 112 on the left sensor head $110_L$ and the common optical target 108, and a second coordinate transform between at least one of the cameras 112 on the right sensor head $110_R$ and the common optical target 108. Since the relationships between each of the cameras 112 on the left sensor head $110_L$, and optical targets 102 in the associated fields of view FOV are known, and corresponding information is also known for the cameras 112 in the right sensor head $110_R$ and optical targets 102 in the associated fields of view FOV, all measurements may be mathematically transformed into a single common coordinate system, and the alignment of the vehicle wheels determined, based on the measured transforms to the common optical target 108. These mathematical transformations are well known to those of ordinary skill, such as shown in U.S. Pat. No. 5,724,128 to January.

In alternate embodiments of the present invention which include optical targets 105 disposed on the runway system 106, the positional relationships, or coordinate system transformations, between the cameras 112 disposed in the left sensor head $110_L$, and the cameras 112 disposed in the right sensor head $110_R$ are determined by the computer 116. The computer 116 is configured to utilize a coordinate transformation between one of the cameras 112 on the left sensor head $110_L$ and the common optical target 108, and a second coordinate transform between one of the cameras 112 on the right sensor head $110_R$ and the common optical target 108. Since the relationships between each of the cameras 112 on the left sensor head $110_L$, and optical targets 102 and 105L in the associated fields of view FOV are known, and corresponding information is also known for the cameras 112 in the right sensor head 110R and optical targets 102 and 105R in the associated fields of view FOV, all measurements may be mathematically transformed into a single common coordinate system, and the alignment of the vehicle wheels determined as described in U.S. Pat. No. 5,724,128 to January, relative to a plane established by the position of the runway system 106.

An advantage of the machine vision vehicle wheel alignment system 100 configured with a preferred multi-camera configuration shown in FIG. 2 is that each sensor head $110_R$ and $110_L$ may be independently adjusted vertically to accommodate different vehicle runway heights, and may be independently translated or rotated about the Z or X axis to adjust for vehicles having varied track widths, provided that the common target 108 remains in the field of view of at least one camera 112 from each sensor head $110_R$ and $110_L$. The common target 108 enables the establishment of a single reference coordinate system.

An additional advantage of the machine vision vehicle wheel alignment system 100 configured with a preferred multi-camera configuration shown in FIG. 2 is that each sensor head $110_R$ and $110_L$ may be moved between placement locations without the need to perform a separate field calibration to determine the relationship between each sensor head, provided that a common target 108 remains in the field of view of at least one camera 112 from each sensor head $110_R$ and $110_L$. For automotive service shops configured with multiple alignment service bays, the ability to quickly and easily move the machine vision vehicle wheel alignment system 100 from one service bay to another, without additional setup and preparation, is particularly advantageous. If a unique common target 108 is provided in each service bay, associated calibration values for components in use in that service bay, such as the runway system 106, may be stored and recalled for subsequent use.

Those of ordinary skill in the art will readily recognize that the machine vision vehicle wheel alignment system 100 configured with a preferred multi-camera configuration shown in FIG. 2 and described above may be readily configured to utilize more than two sensor heads 110. The use of more than two sensor heads 110 may be desired to perform vehicle wheel alignments for multi-axle vehicles, such as trucks or trailers. When configured with more than two sensor heads 110, each sensor head 110 must include a camera 112 having a field of view which includes at least one common target 108 which is within the field of view of a camera 112 from at least one additional sensor head 110, to enable the determination of a single reference coordinate system for all of the sensor heads 110. For example, a first common target 108 could be disposed within the field of view for cameras in first and second sensor heads 110. A second common target 108 could be disposed within the field of view for cameras in the second and third sensor heads 110. By providing at least one common target between every sensor head 110, a single reference coordinate system may be mathematically established into which positions and orientations determined from each individual camera 112 may be mathematically transformed.

Figure 3:
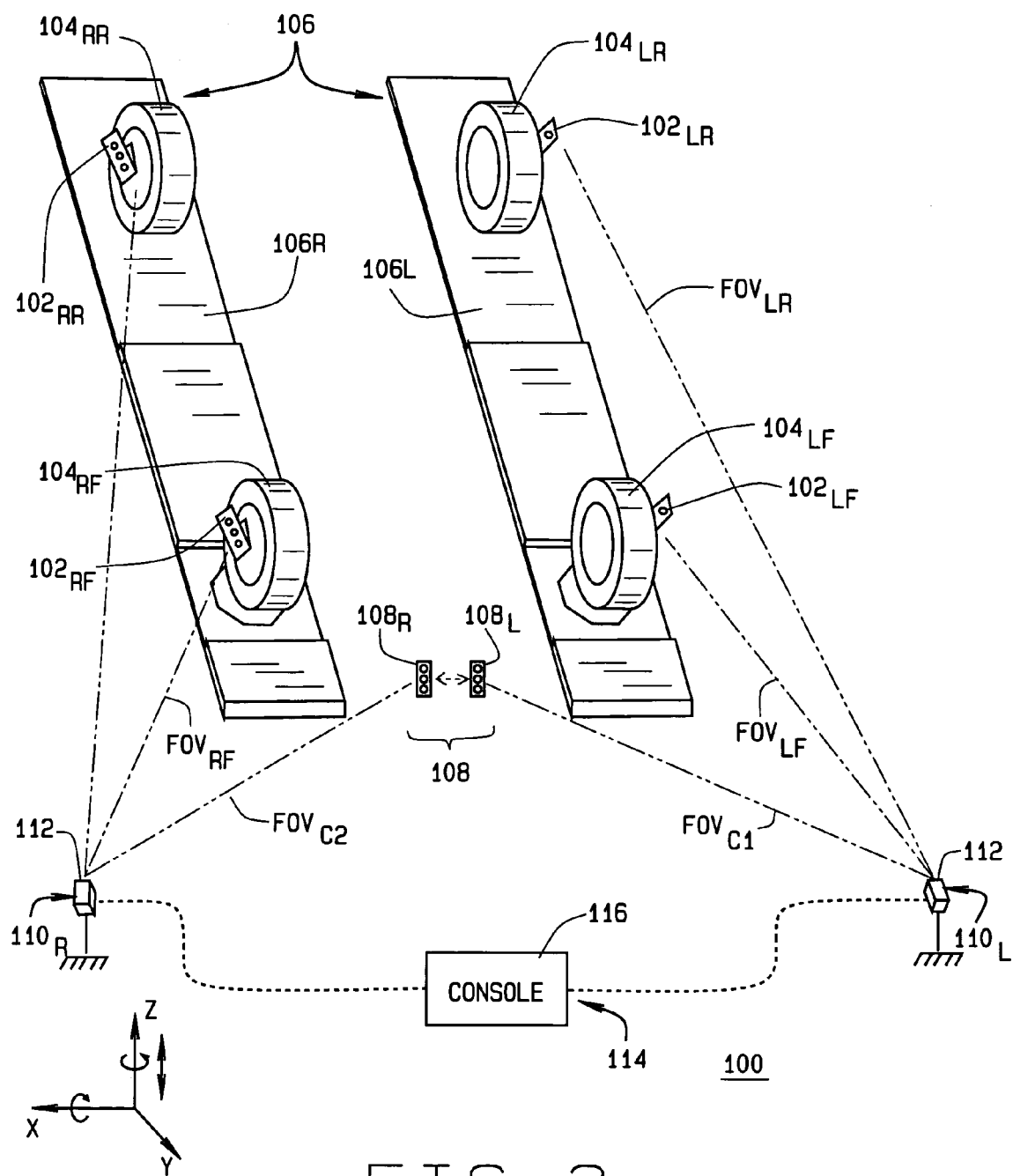
FIG. 3 is an alternate target arrangement of the present invention.

In some machine vision vehicle wheel alignment systems 100, the field of view $FOV_{C1}$ and $FOV_{C2}$ from each sensor head $110_L$ and $110_R$ may not be sufficiently wide enough to encompass a single optical target 108 centrally disposed between each sensor head, as shown in FIG. 2. Accordingly, an alternate embodiment optical target shown in FIG. 3 may be composed of two or more optical target components $108_L$ and $108_R$, in a known relationship, such as shown in FIG. 3. This known relationship may be established with a known structure, or by predetermining a positional relationship between the optical target components $108_L$ and $108_R$, such as an attachment to ground points, prior to use. By displacing optical target components $108_L$ and $108_R$, at least one of the optical target components is presented in the field of view $FOV_{C1}$ and $FOV_{C2}$ for each sensor head $110_L$ and $110_R$. With the optical target components in a known relationship, they may be mathematically treated in the same manner as the single optical target 108 shown in FIG. 2, and a single reference coordinate system determined accordingly from images thereof.

Figure 4:
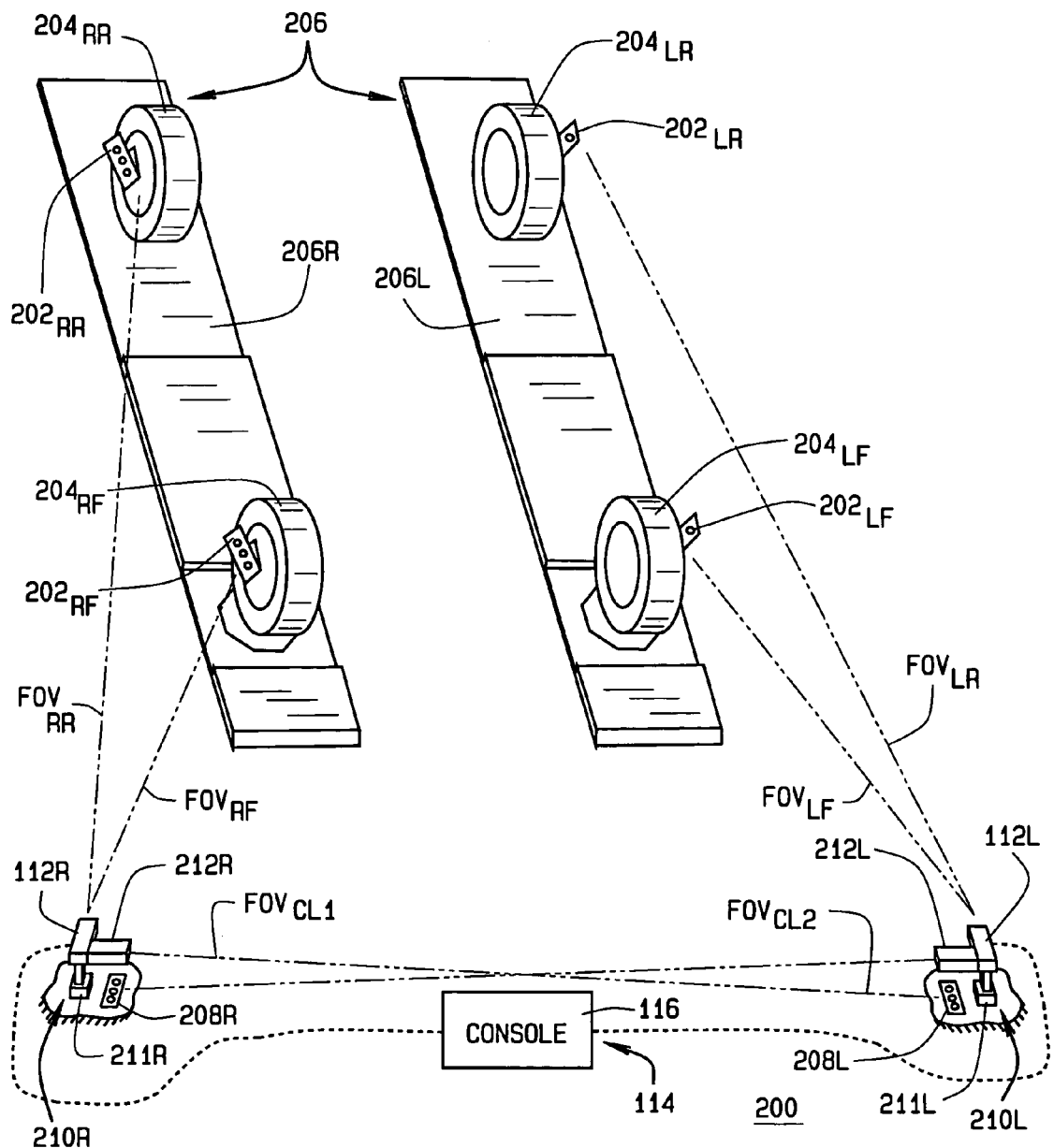
FIG. 4 is a simplified perspective view of a machine vision vehicle wheel alignment system configured with a multi-camera arrangement and a second alternate target arrangement of the present invention.

Turning to FIG. 4, a machine vision vehicle wheel alignment system 200 is shown configured with an alternate multi-camera configuration of the present invention. The machine vision vehicle wheel alignment system 200 includes a set of conventional optical targets $202_{LF}$, $202_{RF}$, $202_{LR}$, and $202_{RR}$, mounted to the wheels $204_{LF}$, $204_{RF}$, $204_{LR}$, and $204_{RR}$ of a vehicle in a conventional manner, such as previously described. The wheels 204 may be either on the runways $206_L$ and $206_R$ of a runway system 206, or disposed on the ground or other fixed surface.

To obtain images of the optical targets 202, a pair of sensor heads $210_L$ and $210_R$ are preferably disposed in front of, and adjacent to, the left and right sides of the vehicle position. One or more cameras 112 disposed in the sensor head $210_L$ have fields of view $FOV_{LF}$ and $FOV_{LR}$ which encompass the optical targets $202_{LF}$ and $202_{LR}$. Correspondingly, one or more cameras 112 disposed in the sensor head $210_R$ have fields of view $FOV_{RF}$ and $FOV_{RR}$ which encompass the optical targets $202_{RF}$ and $202_{RR}$. Those of ordinary skill in the art will recognize that the number of cameras 112 disposed in each sensor head 210 may be varied, provided that images of each optical target 202 are obtained and processed by the machine vision vehicle wheel alignment system 200. When multiple cameras 112 and 212 are disposed in each sensor head 210, the spatial relationships between each of the cameras 112 and 212 in the sensor head 210 may be either determined during manufacture, or prior to use as described in U.S. Pat. No. 5,724,128 to January. These spatial relationships must remain constant between each determination.

To facilitate a determination of the relationships between each sensor head 210, a first cross-reference optical target $208_L$ is rigidly fixed adjacent to the mounting structure 211L of the left sensor head $210_L$. Correspondingly, a second cross-reference optical target $208_R$ is rigidly fixed adjacent the mounting structure 211R of the right sensor head $210_R$. The targets 211L and 211R are in a fixed and predetermined relationship to each other. Each sensor head 210 is further configured with an additional cross-looking camera 212 having an associated field of view, denoted $FOV_{CL1}$ and $FOV_{CL2}$ respectively, in FIG. 4, which encompasses the cross-reference optical target 208 adjacent the opposite sensor head mounting structure 211.

The signals from the cameras 112 and 212 in each sensor head 210 are supplied to a computer 116 which may be disposed within the console 114. The computer 116 is configured with software to utilize data from the acquired images to determine various wheel alignment angles. The relationship, or coordinate system transform, between cameras disposed in the left sensor head $210_L$, and the cameras disposed in the right sensor head $210_R$ is determined by the computer 116 by utilizing the predetermined mounting structure relationships, a measured transform between the camera 212 on the left sensor head $210_L$ and the cross-reference optical target $208_R$, and a measured transform between the camera 212 on the right sensor head $210_R$ and the cross-reference optical target $208_L$.

Since the relationships between each of the cameras 112 and 212 on the left sensor head $210_L$, and optical targets 202 in the associated fields of view FOV are known, and corresponding information is also known for the cameras 112 and 212 in the right sensor head $210_R$ and optical targets 202 in the associated fields of view FOV, all measurements may be mathematically transformed into a single common coordinate frame. The alignment of the vehicle wheels is determined in the common coordinate frame which is based on the measured transforms to the cross-reference optical target $208_L$ and $208_R$ and the predetermined relationship between the mounting structures 211 on which the cameras are disposed.

An advantage of the machine vision vehicle wheel alignment system 200 configured with the alternate multi-camera configuration shown in FIG. 4 is that each sensor head $210_R$ and $210_L$ may be independently adjusted about one or more orthogonal axis relative to the fixed mounting structure 211 to accommodate different vehicle runway heights, provided that the cross-reference optical targets 208 remain in the fields of view of the respective cameras 212 on each sensor head $210_R$ and $210_L$. Signals representative of either the displacement of each sensor head 210 from a predetermined position, or representative of a current position of each sensor head 210 are communicated to the computer 116. The computer 116 is configured to utilize the received signals together with the predetermined positional relationships of the mounting structures 211 to determine a reference coordinate system into which all position and orientation measurements are mathematically transformed in a conventional manner.

Figure 5:
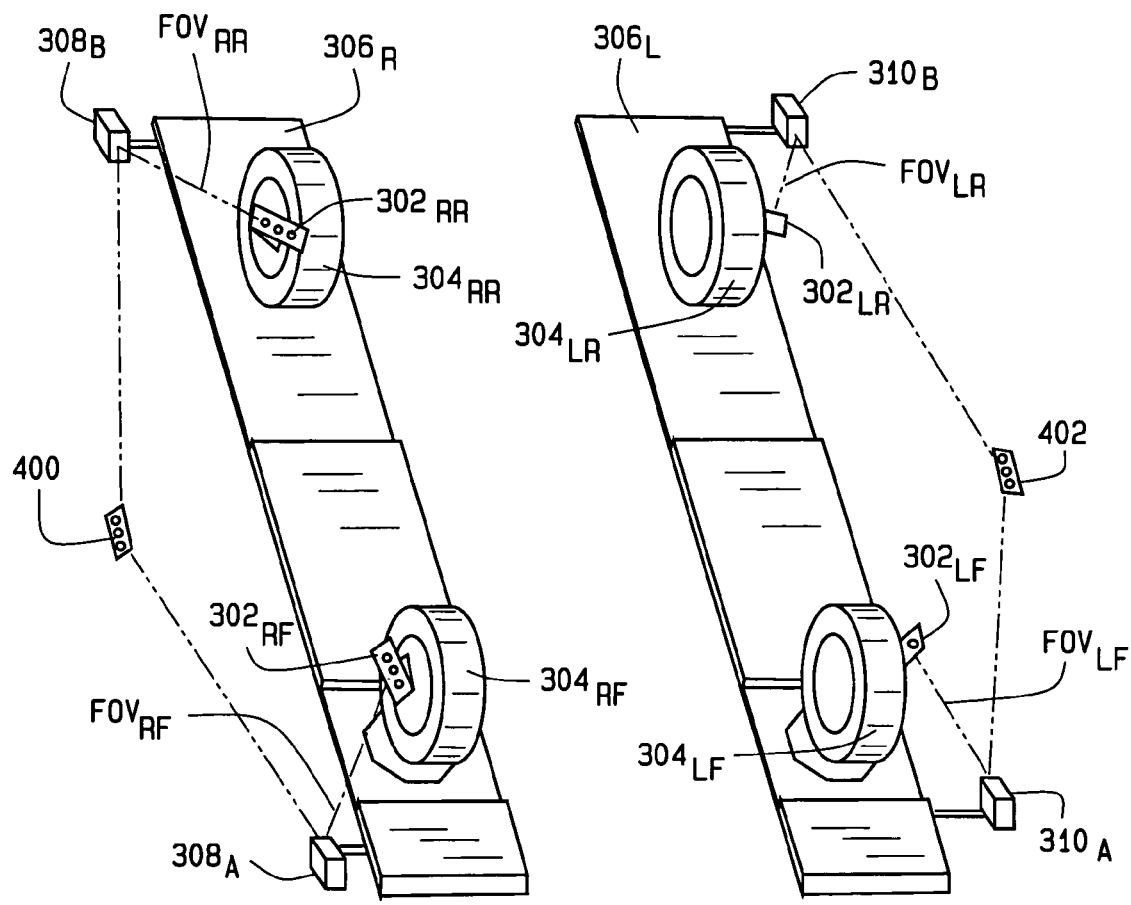
FIG. 5 is a simplified perspective view of an alternate embodiment of the machine vision vehicle wheel alignment system of the present invention with a first target arrangement.

FIG. 5 illustrates an alternate camera and optical target configuration for use with a machine vision vehicle wheel alignment system. In FIG. 5, the machine vision vehicle wheel alignment system 300 includes a set of conventional optical targets $302_{LF}$, $302_{RF}$, $302_{LR}$, and $302_{RR}$, mounted to the wheels $304_{LF}$, $304_{RF}$, $304_{LR}$, and $304_{RR}$ of a vehicle in a conventional manner, such as previously described. The wheels 304 are disposed on ramp $306_L$ and $306_R$ of a runway system 306.

To obtain images of the optical targets 302, a first set of cameras $308_A$ and $308_B$ are secured to the runway $306_R$, and disposed such that at least one of the cameras $308_A$ and $308_B$ includes optical target $302_{RF}$ in a field of view $FOV_{RF}$, and at least one of the cameras $308_A$ and $308_B$ includes optical target $302_{RR}$ in a field of view $FOV_{RR}$. A second set of cameras $310_A$, and $310_B$ are secured to the runway $306_L$, and disposed such that at least one of the cameras $310_A$ and $310_B$ includes optical target $302_{LF}$ in a field of view $FOV_{LF}$, and at least one of the cameras $310_A$ and $310_B$ includes optical target $302_{LR}$ in a field of view $FOV_{LR}$.

Figure 6:
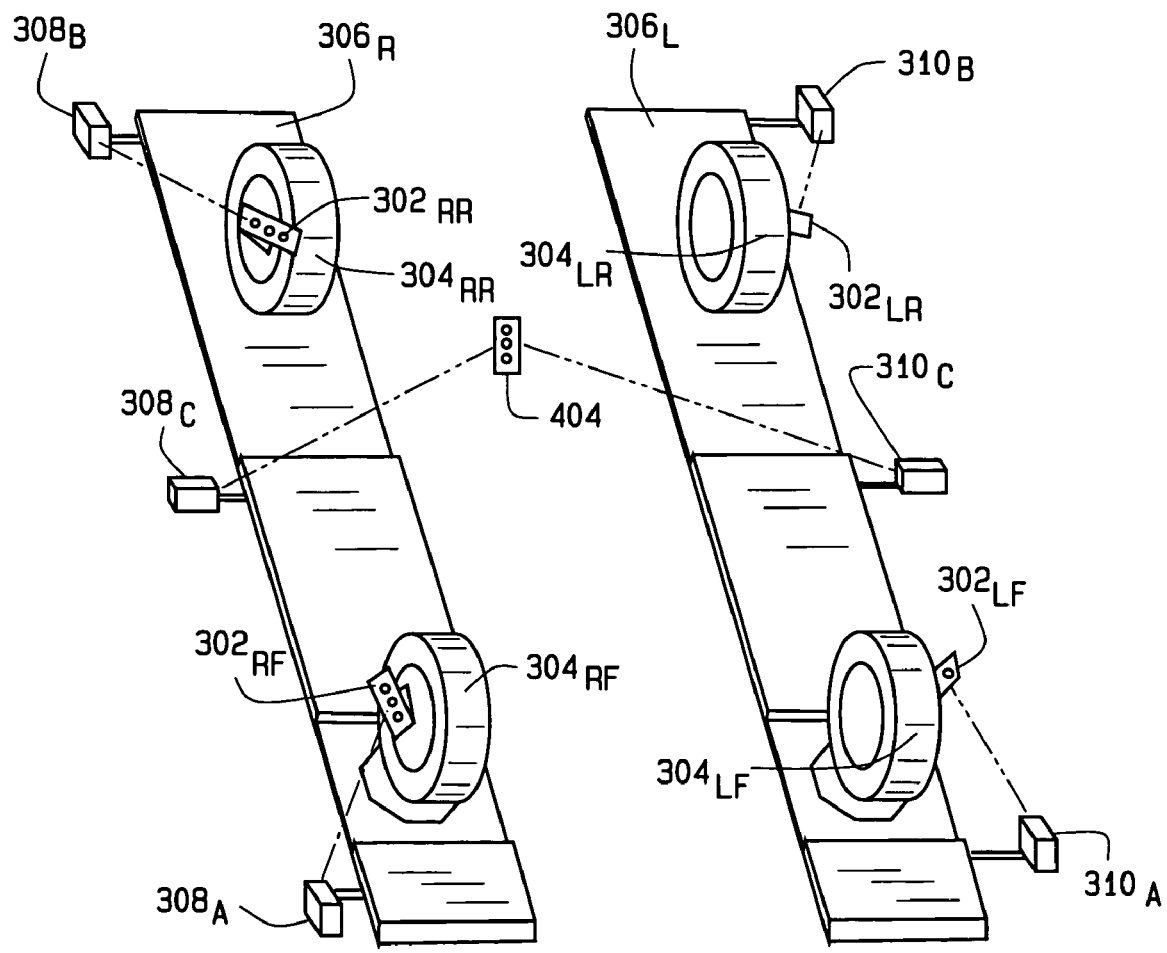
FIG. 6 is a simplified perspective view of the alternate embodiment of the machine vision vehicle wheel alignment system of FIG. 5 with a second target arrangement.

Those of ordinary skill in the art will recognize that the number and placement of cameras 308 and 310 disposed in each runway $306_R$ and $306_L$ may be varied, provided that images of each optical targets 302 are obtained and processed by the machine vision vehicle wheel alignment system 300. For example, as shown in FIG. 6, the cameras 308 and 310 may be spaced apart along the length of each runway $306_R$ and $306_L$. Furthermore, the front cameras $308_A$, $310_A$ may be configured to view either the front optical targets $302_{RF}$, $302_{LF}$ as shown, or alternatively, the rear optical targets $302_{RR}$, $302_{LR}$ Correspondingly, the rear cameras $308_B$, $310_B$ may be configured to view either the rear optical targets $302_{RR}$, $302_{LR}$ as shown, or alternatively, the front optical targets $302_{RF}$, $302_{LF}$.

A right common reference target 400 is disposed in the field of views of at least one of the cameras $308_A$ and in the field of view of at least one of the cameras $308_B$, disposed at opposite ends of runway $306_R$. Correspondingly, a left common reference target 402 is disposed in the fields of views of at least one of the cameras $310_A$ and $310_B$, disposed at opposite ends of runway $306_L$. The spatial relationships between each of the common reference targets 400 and 402 is predetermined. Those of ordinary skill in the art will recognize that if the relationship between cameras $308_A$ and $308_B$ is predetermined, then only one camera is required to view the reference target 400 and correspondingly, if the relationship between cameras $310_A$ and $310_B$ is predetermined, then only one camera is required to view the reference target 402. The alignment of the vehicle wheels is determined in the common coordinate frame which is based on the measured transforms to the optical target 400.

In an alternate embodiment shown in FIG. 6, third cameras $308_C$ and $310_C$, on each runway, are each configured with a field of view which includes a center common reference target 404. Each of the common reference targets 400, 402, and 404 consists of either an individual optical target structure, as shown in FIG. 5 and FIG. 6, or alternatively, may consist of paired optical target structures secured together in a known relationship, as shown in FIG. 3.

Preferably, in order to fully account for all movement of the runways $306_R$ and $306_L$, the common reference targets 400, 402, and 404 are each mounted to the floor, a wall, or a ceiling. Alternatively, if the runway system is sufficiently stable, the common reference targets 400, 402, and 404 may be rigidly secured to one or more of the runway $306_R$ or $306_L$.

The left and right common reference targets 400 and 402 are utilized as previously described, to establish a common coordinate reference system for the associated front and rear viewing cameras, i.e., a left common coordinate reference system, and a right common coordinate reference system. With this embodiment, the relationship between either the runways $306_R$ and $306_L$ or the optical targets 400 and 402 is predetermined and assumed to be fixed, thereby permitting the establishment of a common reference coordinate system for all of the cameras and a determination of the vehicle alignment as previously described.

Alternatively, if the relationship between the runways $306_R$ or $306_L$ is not predetermined, or is not fixed, but the relationship between each camera in a set 308 or 310 is predetermined and fixed, the center common reference target 404 is employed as previously described to establish a common coordinate reference system for the associated cross-looking viewing cameras, i.e., a common coordinate reference system between the sets of cameras 308 and 310. Once these relationships are established, then all of the individual camera relationships are known, permitting the establishment of a common reference coordinate system and a determination of the vehicle alignment as previously described.

Those of ordinary skill in the art will recognize that redundant measurements may be obtained by combining the camera and target configurations shown in FIGS. 5 and 6. After installation, and during operation, any motion of the runway $306_R$ and $306_L$ such as deflection, can be identified from the changes in the relationships between the cameras 308, 310 and the common reference targets 400, 402, or 404. Identification of deflection in the runways $306_R$ and $306_L$ is compensated for by the machine vision vehicle wheel alignment system computer during the establishment of a common reference coordinate system.

In alternative embodiments of the present invention, the rearward looking cameras 308A, 310A, the forward looking cameras 308B, 310B, and the cross-looking cameras 308C, 310C shown in FIGS. 5 and 6 may be replaced by sensor heads such as sensor heads 110 previously described, each having multiple cameras and fields of view which encompass one or more optical targets on the vehicle wheels, and one or more common reference targets. For example, a rearward looking camera 308A in FIG. 6 could be replaced by a sensor head having one camera disposed to view an optical target $302_{RF}$, and a second camera disposed to view the common reference target 400. The relationship between the two cameras in the sensor head is fixed and predetermined as previously described.

The present invention can be embodied in part in the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus, for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An improved machine vision vehicle wheel alignment system including a first camera system configured to view at least one optical target disposed on a first side of a vehicle, a second camera system configured to view at least one optical target disposed on a second side of the vehicle, and a processor configured to process images and to calculate vehicle wheel alignment measurements, the improvement wherein:
   a plurality of reference targets, each of said plurality of reference targets disposed within a field of view of said camera systems;
   said first camera system and said second camera system are configured for independent movement relative to each other; and
   wherein said processor is configured to utilize images obtained by said first and second camera systems to identify a relationship between at least one of said reference targets and each of said camera systems to establish a common reference coordinate system between said first camera system and said second camera system.

2. An improved machine vision vehicle wheel alignment system including a first movable camera system configured to view one or more optical targets disposed on a first side of a vehicle disposed in a service bay, a second movable camera system configured to view one or more optical targets disposed on a second side of the vehicle, and a processor configured to process image data received from the camera systems to calculate vehicle wheel alignment measurements, the improvement wherein:
   said first movable camera system and said second movable camera system have a variable positional relationship relative to each other;
   at least one unique reference target structure fixedly associated with each of said plurality service bays;
   wherein during a vehicle service procedure in a selected one of said plurality of service bays, said associated at least one unique reference target structure is disposed within a field of view of at least one camera from said first movable camera system and within a field of view of at least one camera from said movable second camera system; and
   wherein said data processor is configured to utilize identified relationships between said associated at least one unique reference target structure, said first movable camera system, and said second movable camera system to establish a common reference coordinate system associated with said selected service bay.

3. The improved machine vision vehicle wheel alignment system of claim 1 wherein said processor is further configured to store a plurality of calibration values associated with said plurality of service bays each having an associated unique reference target structure, said calibration values each indexed to at least one of said unique reference target structures to identify said associated service bays.

4. A method for configuring a machine vision vehicle wheel alignment system having a first camera system configured to view at least a first set of optical targets associated with a vehicle and at least a second camera system configured to view at least a second set of optical targets associated with a vehicle, comprising:
   positioning said first camera system to acquire images of said first set of optical targets, said first camera system including at least one alignment camera configured to view at least one optical target in said first set of optical targets and a common reference target in the same field of view;
   positioning said second camera system to acquire images of said second set of optical targets, said second camera system including at least one alignment camera configured to view at least one optical target in said second set of optical targets and said common reference target structure in the same field of view;
   wherein a positional relationship between said first camera system and said second camera system is variable;
   acquiring images of at least one optical target in said first set of optical targets visible in said field of view of said first camera system;
   acquiring images of at least one optical target in said second set of optical targets visible in said field of view said second camera system;
   acquiring from each camera system, at least one image of said common reference target; and
   following each positioning movement of said first and second camera systems during a vehicle service procedure, establishing a common reference coordinate system associated with a current positional relationship between said first and second camera systems from said acquired images of said common reference target.

5. The method of claim 4 for configuring a machine vision vehicle wheel alignment system further including the steps of:
   establishing a first coordinate reference system from said acquired images of said common reference target within said field of view of said first camera system;
   establishing a second coordinate reference system from said acquired images of said common reference target within said field of view of said second camera system; and
   utilizing said first coordinate reference system and said second coordinate reference system to establish said common coordinate reference system.

6. A method for configuring a machine vision vehicle wheel alignment system having a first camera system configured to view a first set of optical targets including at least one fixed reference target and at least one alignment target and a second camera system configured to view a second set of optical targets including at least one fixed reference target and at least one alignment target, the fixed reference targets in the first and second sets of optical targets having a predetermined relationship, comprising:

positioning at least one camera in said first camera system to have a field of view including said fixed reference target and an alignment target from said first set of optical targets;

positioning said second camera system to have a field of view including said fixed reference target and an alignment target from said second set of optical targets;

acquiring at least one image of said fixed reference target from said first set of optical targets with said first camera system;

acquiring at least one image of said fixed reference target from said second set of optical targets with said second camera system; and establishing a common reference coordinate system from said acquired images and the predetermined relationship between said first and second fixed reference targets from said sets of optical targets.

7. The method of claim 6 for configuring a machine vision vehicle wheel alignment system further including the steps of:

wherein positioning of said first camera system may vary relative to the positioning of said second camera system.

8. The improved machine vision vehicle wheel alignment system of claim 1 wherein said plurality of reference targets are identifiably associated with a vehicle service bay; and wherein said data processor is further configured to store at least one calibration value associated with said vehicle service bay, said stored calibration value indexed to said plurality of reference targets identifiably associated with said vehicle service bay.

9. The improved machine vision vehicle wheel alignment system of claim 1 wherein said first camera system includes at least one alignment camera configured to view at least one optical target disposed on the first side of a vehicle and said at least one of said reference targets in the same field of view;

wherein said second camera system includes at least one alignment camera configured to view at least one optical target disposed on the second side of the vehicle and said at least one of said reference targets in the same field of view.

* * * * *